United States Patent
Spittle et al.

(10) Patent No.: US 8,555,544 B2
(45) Date of Patent: *Oct. 15, 2013

(54) VISUAL ATTENUATION COMPOSITIONS AND METHODS OF USING THE SAME

(75) Inventors: Kevin S. Spittle, Vero Beach, FL (US); Marc S. Theisen, Signal Mountain, TN (US); Jessie Clark, Granite Falls, NC (US); James D. Tanner, Northbrook, IL (US)

(73) Assignee: Profile Products L.L.C., Buffalo Grove, IL (US)

( * ) Notice: Subject to any disclaimer, the term of this patent is extended or adjusted under 35 U.S.C. 154(b) by 1111 days.

This patent is subject to a terminal disclaimer.

(21) Appl. No.: 12/496,900

(22) Filed: Jul. 2, 2009

(65) Prior Publication Data

US 2009/0265979 A1    Oct. 29, 2009

Related U.S. Application Data

(60) Provisional application No. 61/077,909, filed on Jul. 3, 2008.

(51) Int. Cl.
*A01G 7/00*    (2006.01)

(52) U.S. Cl.
USPC .................................................. 47/9; 428/364

(58) Field of Classification Search
USPC ............................................................. 47/9
See application file for complete search history.

(56) References Cited

U.S. PATENT DOCUMENTS

| | | |
|---|---|---|
| 1,962,806 A | 6/1934 | Clapp |
| 2,092,183 A | 9/1937 | Rehfeld |
| 2,158,025 A | 5/1939 | van Leeuwen et al. |
| 2,699,629 A | 2/1954 | MacNeil et al. |

(Continued)

FOREIGN PATENT DOCUMENTS

| | | |
|---|---|---|
| EP | 0 161 766 | 10/1989 |
| EP | 0 492 016 | 9/2002 |

(Continued)

OTHER PUBLICATIONS

The Commonwealth of Pennsylvania Department of Transportation Roadside Vegetation Management Research Report—Eleventh Year Report, The Pennsylvania State University Research Project #85-08; Report #PA 97-4620+85-08, Jun. 12, 1997, p. 56.

Nissan Kizai Nice, Inc.—Fiber Length "A Factor in Holding Capacity of Woodfiber Mulch" Aug./Sep. 1989, 1 page.

(Continued)

*Primary Examiner* — Lynda Salvatore (74) *Attorney, Agent, or Firm* — Brooks Kushman P.C.

(57) ABSTRACT

According to one aspect of the present invention, a visual attenuation composition is provided to be applicable to a landscape to visually attenuate or camouflage the landscape to approximate color characteristics of the surrounding terrain. The visual attenuation composition includes a colorant selected from the group consisting of a pigment, a dye, and combinations thereof, and optionally an additive selected from the group consisting of a flocculent, a tackifier, a stabilizer, and combinations thereof. The visual attenuation composition can be formulated to impart colorfastness as applied for a period of up to 6 weeks or longer. The visual attenuation composition described herein can be premixed with an erosion control medium or a blended mulch product described herein to impart desirable color and colorfastness. Alternatively, the erosion control medium and the blended mulch product can be applied to a ground surface prior to coloring and or color reinforcement with the visual attenuation composition.

16 Claims, 5 Drawing Sheets

(56) References Cited

U.S. PATENT DOCUMENTS

| | | |
|---|---|---|
| 2,789,399 A | 4/1957 | Finn |
| 2,818,682 A | 1/1958 | Finn |
| 2,825,983 A | 3/1958 | Finn |
| 2,842,897 A | 7/1958 | Finn |
| 2,844,914 A | 7/1958 | Finn |
| 2,878,617 A | 3/1959 | Finn |
| 2,879,003 A | 3/1959 | Finn |
| 2,923,093 A | 2/1960 | Allen |
| 2,949,871 A | 8/1960 | Finn |
| 2,952,492 A | 9/1960 | Finn |
| 2,952,493 A | 9/1960 | Finn |
| 2,990,019 A | 6/1961 | Finn |
| 3,091,436 A | 5/1963 | Finn |
| 3,241,173 A | 3/1966 | Finn |
| 3,292,307 A | 12/1966 | Finn |
| 3,407,432 A | 10/1968 | Finn |
| 3,517,514 A | 6/1970 | Visser |
| 3,644,171 A | 2/1972 | Bevan et al. |
| 3,696,559 A | 10/1972 | Hatton |
| 3,712,866 A | 1/1973 | Falconer |
| 3,763,072 A | 10/1973 | Krieger |
| 3,772,893 A | 11/1973 | Ellers |
| 3,812,615 A | 5/1974 | Jamison |
| 3,818,998 A | 6/1974 | Hessert |
| 3,881,278 A | 5/1975 | Videen |
| 3,895,956 A | 7/1975 | Yoshida et al. |
| 3,899,984 A | 8/1975 | Keyes et al. |
| 3,942,457 A | 3/1976 | Keyes et al. |
| 3,950,179 A | 4/1976 | Schneider |
| 3,973,355 A | 8/1976 | McKenzie |
| 3,986,365 A | 10/1976 | Hughes |
| 4,002,034 A | 1/1977 | Muhring et al. |
| 4,022,633 A | 5/1977 | Schneider |
| 4,051,086 A | 9/1977 | Reid |
| 4,058,124 A | 11/1977 | Yen et al. |
| 4,067,140 A | 1/1978 | Thomas |
| 4,128,692 A | 12/1978 | Reid |
| 4,154,174 A | 5/1979 | Rees, Jr. et al. |
| 4,297,810 A | 11/1981 | Hansford |
| 4,333,461 A | 6/1982 | Muller |
| 4,337,117 A | 6/1982 | Bodendorf et al. |
| 4,364,197 A | 12/1982 | Baron |
| 4,369,597 A | 1/1983 | Leep et al. |
| 4,414,776 A | 11/1983 | Ball |
| 4,415,463 A | 11/1983 | Mosier et al. |
| 4,432,666 A | 2/1984 | Frey et al. |
| 4,458,042 A | 7/1984 | Espy |
| 4,476,185 A | 10/1984 | Spittle |
| 4,551,165 A | 11/1985 | Warner |
| 4,624,868 A | 11/1986 | Muller |
| 4,637,759 A | 1/1987 | Takeda et al. |
| 4,693,763 A | 9/1987 | Ross et al. |
| 4,743,288 A | 5/1988 | Hirsbrunner |
| 4,787,928 A | 11/1988 | Balassa |
| 4,790,691 A | 12/1988 | Freed |
| 4,826,880 A | 5/1989 | Lesniak et al. |
| 4,919,681 A | 4/1990 | Tyler et al. |
| 4,921,803 A | 5/1990 | Nohr |
| 5,007,766 A | 4/1991 | Freed et al. |
| 5,012,974 A | 5/1991 | Johnson |
| 5,017,319 A | 5/1991 | Shen |
| 5,053,482 A | 10/1991 | Tietz |
| 5,082,500 A | 1/1992 | O'Shea et al. |
| 5,096,748 A | 3/1992 | Balassa |
| 5,147,441 A | 9/1992 | Megeed |
| 5,195,465 A | 3/1993 | Webb et al. |
| 5,207,826 A | 5/1993 | Westland et al. |
| 5,226,255 A | 7/1993 | Robertson |
| 5,272,000 A | 12/1993 | Chenoweth et al. |
| 5,300,192 A | 4/1994 | Hansen et al. |
| 5,301,460 A | 4/1994 | Corbitt |
| 5,326,192 A | 7/1994 | Freed |
| 5,382,610 A | 1/1995 | Harada et al. |
| 5,447,866 A | 9/1995 | Runyon |
| 5,456,733 A | 10/1995 | Hamilton |
| 5,459,181 A | 10/1995 | West et al. |
| 5,476,711 A | 12/1995 | Hebbard et al. |
| 5,484,501 A | 1/1996 | Jacobsen |
| 5,507,845 A | 4/1996 | Molnar et al. |
| 5,516,830 A | 5/1996 | Nachtman et al. |
| 5,532,298 A | 7/1996 | Monroe et al. |
| 5,556,033 A | 9/1996 | Nachtman |
| 5,567,087 A | 10/1996 | Theisen |
| 5,616,399 A | 4/1997 | Theisen |
| 5,649,495 A | 7/1997 | Salestrom |
| 5,679,364 A | 10/1997 | Levy |
| 5,741,832 A | 4/1998 | Spittle |
| 5,779,782 A | 7/1998 | Spittle |
| 5,849,364 A | 12/1998 | Nachtman et al. |
| 5,849,645 A | 12/1998 | Lancaster |
| 5,909,718 A | 6/1999 | Sheehan |
| 5,916,027 A | 6/1999 | Spittle |
| 5,942,029 A | 8/1999 | Spittle |
| 6,076,299 A | 6/2000 | Spittle et al. |
| 6,096,126 A | 8/2000 | Tanner et al. |
| 6,135,672 A | 10/2000 | Davidson |
| 6,155,749 A | 12/2000 | Tanner et al. |
| 6,156,682 A | 12/2000 | Fletemier et al. |
| 6,158,167 A | 12/2000 | Spittle |
| 6,207,228 B1 * | 3/2001 | Hundt et al. .................. 427/213 |
| 6,293,045 B1 * | 9/2001 | Morgan ............................ 47/9 |
| 6,349,499 B1 | 2/2002 | Spittle |
| 6,351,911 B1 | 3/2002 | Behrens |
| 6,358,312 B1 | 3/2002 | Tanner et al. |
| 6,360,478 B1 | 3/2002 | Spittle |
| D456,224 S | 4/2002 | Lancaster |
| D456,674 S | 5/2002 | Lancaster |
| 6,523,299 B2 | 2/2003 | Morris |
| 6,635,329 B1 | 10/2003 | Arndt et al. |
| 6,688,038 B1 | 2/2004 | Paternoster et al. |
| 6,711,850 B2 * | 3/2004 | Yelanich et al. ............... 47/59 R |
| 6,729,068 B2 | 5/2004 | Dooley et al. |
| 6,729,807 B1 | 5/2004 | Spittle |
| 7,484,330 B2 * | 2/2009 | Lougheed ........................... 47/9 |
| 7,681,353 B2 * | 3/2010 | Lougheed ........................... 47/9 |
| 7,730,662 B2 * | 6/2010 | Krysiak et al. ............. 47/58.1 SC |
| 7,900,394 B2 * | 3/2011 | Ellis et al. ........................... 47/9 |
| 2003/0060113 A1 | 3/2003 | Christie et al. |
| 2004/0091326 A1 | 5/2004 | Spittle |
| 2004/0202851 A1 | 10/2004 | Goodrum et al. |
| 2006/0070294 A1 * | 4/2006 | Spittle ................................. 47/9 |

FOREIGN PATENT DOCUMENTS

| | | |
|---|---|---|
| GB | 2 254 769 | 10/1991 |
| GB | 2 245 555 | 1/1992 |
| WO | 9107534 | 5/1991 |
| WO | 9108759 | 6/1991 |
| WO | 9207985 | 5/1992 |

OTHER PUBLICATIONS

V. Steven Green and D.E. Stott-Polyacrylamide: A Review of the Use, Effectiveness, and Cost of a Soil Erosion Control Amendment, 10th Intl. Soil Conservation Org. Meet., May 24-29, 1999, Purdue.

Donald H. Gray/Robbin S. Sotir—Biotechnical and Soil Bioengineering SLOPE STABILIZATION—Practical Guide for Erosion Control, Oct. 1995, 8 pages.

Finn Corporation—Finn A500 Hydro-Stick (Articles Instructions for Use etc.), 1998, 7 pages.

Material Safety Data Sheet—Identity: Finn FiberPlus Oct. 3, 2002, 2 pages.

Canadian Forest Products, Inc. "Tests of Various Rates of EcoAegis and Soil Guard for Erosion Control land Plant Growth Enhancement Under Simulated Rain and Sunlight"—Original Report: Dec. 1995; Corrected and amended: Jun. 1998 (Gilberto E. Urroz, Utah Water Research Laboratory, College of Engineering, Utah State University, Logan, Utah), 15 pages.

Canadian Forest Products Ltd. "Tests of New Erosion Control Products Under Simulated Rain and Sunlight—Test I"—Jul. 1995 (Gilberto E. Urroz, Utah Water Research Laboratory, College of Engineering, Utah State University, Logan, Utah), 14 pages.

(56) References Cited

OTHER PUBLICATIONS

Finn Corporation Spring 1995—Finninfo—News and thoughts from the Finn Corporation, 4 pages.
Jim Lincoln—"Hydro-Mulching—An Overview", 1992, James Lincoln Corp., 8 pages.

IECA Standard Mulch and Mulch Mediums—Mar. 1, 1995, Mulch Standards Comm., Atlanta, 3 pages.
Land and Water—The Magazine of Natural Resource Management and Restoration Sep./Oct. 1992 "Hydraulic Planting" Special Reprinted Edition, 3 pages.

* cited by examiner

FIG. 6

VISUAL ATTENUATION COMPOSITIONS AND METHODS OF USING THE SAME

CROSS-REFERENCE TO RELATED APPLICATIONS

This application claims benefit from U.S. provisional application Ser. No. 61/077,909, filed Jul. 3, 2008, the entire contents thereof are incorporated herein by reference.

BACKGROUND

1. Technical Field

The present invention is directed to compositions to visually attenuate or camouflage a landscape to approximate color characteristics of the surrounding natural terrain, and in particular to providing an erosion control medium formed from a blended mulch product including the visual attenuation.

2. Background Art

General land constructions include mining, energy and natural resource extraction, and large scale land developing often result in soil bare areas that depreciate the overall aesthetics of the surrounding terrain. For instance, earth change plans (ECP) are developed for areas of soil erosion and sedimentation which may leave bare patches. Bare patches while re-growing may take months and or years to reach the appropriate density to approximate the surrounding landscape. Current treatments to camouflage areas of the landscape which are incongruous with the surrounding natural terrain include spray paints. However, under high wind conditions the mulches are scattered. Although the spray paints provide good coverage and camouflage, rainwater has been known to dilute the color of some grass spray paints and prevent uniform attachment. The spray paints are only practical for small patches of brown or faded grass and not useful for completely bare patches of soil or large industrial development project areas.

SUMMARY

According to one aspect of the present invention, a visual attenuation composition is provided applicable to a landscape to visually attenuate or camouflage the landscape to approximate color characteristics of the surrounding terrain. The visual attenuation composition includes a colorant selected from the group consisting of a pigment, a dye, and combinations thereof, and optionally an additive selected from the group consisting of a flocculant, a tackifier, a stabilizer, and combinations thereof. The visual attenuation composition, as applied to an erosion control medium and or a blended mulch product, can be formulated to impart color and or colorfastness for a period of up to 6 months, depending upon the particular application at hand. The visual attenuation composition described herein can be premixed with the blended mulch product prior to application onto a landscape. Additionally, the blended mulch product can be applied the landscape prior to application with the visual attenuation composition for further color reinforcement.

DETAILED DESCRIPTION OF THE PREFERRED EMBODIMENT(S)

The present invention provides compositions for approximating color characteristics of a landscape in view of its surrounding terrain to provide an overall aesthetic value, and methods for the use thereof. The surrounding natural terrain may have a color of red, yellow, blue, white, black, orange, pink, green, brown, or any combinations thereof. As used herein, the color characteristics of the surrounding natural terrain are approximated by the color features of the visual attenuated compositions herein when a color difference between the former and the latter can no be observed by ordinary bare eye viewing or the color difference is no more than 30%, 20%, or 10% by a suitable color-measuring method as described herein elsewhere in relation to colorfastness.

It has been found that there is an unmet need in the art for compositions and methods thereof suitable for approximating color characteristics of a landscape in view of its surrounding terrain to provide an overall aesthetic value. In particular, there is an unmet need in the art for compositions and or methods suitable for camouflaging introduced plant materials, exposed soil and rocks, and other natural features, with their surrounding natural vegetation. It has further been found that there is an unmet need in the art for these compositions compatible with a variety of treatments and materials to re-establish vegetation or reclaim disturbed sites such as erosion control mats and blankets, camouflage fabrics, rock staining products, and hydraulic or straw/hay mulches. The compositions should be capable of attachment to a target surface in order to withstand erosive forces and high winds. Additionally, it would be useful to have a visual attenuation composition which may be applied directly to bare soil areas undergoing remediation, reclamation and re-growth of the terrain.

According to one aspect of the present invention, a visual attenuation composition is provided to be applicable to a landscape to visually attenuate or camouflage the landscape to approximate color characteristics of the surrounding terrain. The visual attenuation composition includes a colorant selected from the group consisting of a pigment, a dye, and combinations thereof; and optionally an additive selected from the group consisting of a flocculent, a tackifier, a stabilizer, and combinations thereof. The visual attenuation composition is optionally formulated into a slurry through, for example, the use of a water-based medium, such that the visual attenuation composition can be spray applied. The composition is optionally supplemented with various soil treatment or growth promoting products to customize the visual attenuation system for the surrounding terrain, i.e. exposed slopes and/or rocky, steep terrain. The hydraulic application method chosen should be adequate to ensure proper mixing and maintain a uniform slurry during dispersal onto the surface of the treatment area.

In certain particular instances, a selection of pigments and or dyes as the colorant, either as a liquid or a powder, is mixed with water in a mixing tank such as a hydro-seeder, to form a colorant/water slurry. The colorant/water slurry is spray-applied onto a landscape including a bare soil area and to camouflage the landscape to impart desirable colorfastness while approximating the surrounding natural terrain. As used herein, the term colorfast or colorfastness means that the visual attenuation composition retains at least 50% of its color, preferably at least 75% and more preferably at least 80 or 90% after outdoor exposure for a pre-determined period of time. One can measure color by any suitable methods. One example is to capture color images by for instance a digital camera and analyze color intensities by quantifying image pixels. The spray-application may be repeated for additional color reinforcement. The extent of the colorfastness of a treated landscape depend on several factors, including the amount of the colorant used per a given weight of a soil treatment product such as a porous blended mulch and a biological soil nutrient composition as described herein elsewhere. The factors also include a total number of repeating applications, whether additional color reinforcement agents such as a mordant are used. In general, the visual attenuation composition, for instance in a water slurry, can be formulated considering the factors as illustrated above, to impart colorfastness for a period of up to about 6 months.

The visual attenuation composition as described with more details herein elsewhere can also be used to impart a color to a soil treatment product before their being applied onto a landscape. In particular, the soil treatment product, including the erosion control medium and the fiber mulch product described herein, is colored with the visual attenuation composition during manufacture and the resulting soil treatment product is subsequently packaged as being pre-colored. The pre-colored soil treatment product can be added to a hydroseeder prefilled with water to form a slurry and spray-applied at the site of application. Alternatively, an un-colored soil treatment product can be colored at the site of application upon combination with the visual attenuation composition described herein to form a colored-product, optionally in a sprayable consistency, for application to the landscape.

In one embodiment, the visual attenuation composition includes approximately 0.1% to 50% by weight of a colorant. When used, a flocculant is added at approximately 0.01% to 2% by weight, a tackifier is added at approximately 0.1% to 5% by weight, and a stabilizer is added at approximately 0.1% to 5% by weight. The visual attenuation composition can be hydraulically applied directly to the surface of the terrain to visually enhance the landscape when viewed from a distance.

When used, the pigments selectively reflect and absorb certain wavelengths of light among themselves, and or in combination with one or more dyes as described herein elsewhere. A non-limiting list of colors includes green, blue, yellow, red, black, and white. These pigments can be used in combination to create a palate to closely approximating color characteristics of the surrounding terrain. The reflected light spectrum creates the appearance of a color. Sunlight creates a more uniform spectrum than artificial light. There are many pigment groups which may be combined to form specific colors. Some pigment groups are more compatible than others which increases or decreases the intensity of the color. The pigments selected for the visual attenuation system will be taken from pigment groups including but not limited to: arsenic pigments, carbon pigments, cadmium pigments, iron oxide pigments, chromium pigments, cobalt pigments, lead pigments, copper pigments, titanium pigments, ultramarine pigments, mercury pigments, zinc pigments, clay earth pigments (which include iron oxides), pigments of biological origin and other organic pigments.

The pigments can be suspended and diluted in a water-based medium, a spirit-based medium such as an ethanol or methanol based medium. A spirit-based medium such as an acrylic polymer emulsion is preferable in rainy areas because it can be diluted with water but is water-resistant when dry. This makes the composition more colorfast and water-resistant. Spirit-based media with an acrylic polymer emulsion is suitable for use on wood, masonry, plaster and fabric. A water-based composition may be preferable in arid climates to facilitate application. The water-based composition may also be considered when the size of the target terrain is small or a short-term length of time is required for camouflage.

Exemplary tackifiers are dry or liquid blends containing for example, polysaccharides, vegetable gums including guar and xanthum, linear polymers of acrylamide, starches, vinyl copolymers and acrylic resins which have adhesive properties. The tackifiers enable the visual attenuation system to adhere to the target location. The soil tackifiers also increase the colorfastness of the composition. The tackifier is optionally a gel-forming activator. Non-limiting examples for the gel-forming tackifier include a blended, cross-linked, hydrocolloid-based binder with mineral activators. A hydrocolloid is a substance that is capable of forming a gel with water. Macromolecules, such as carbohydrate polymers (e.g. polysaccharides such as cellulose and starch) or a protein, that are water soluble are general examples of hydrocolloids. Specific examples of hydrocolloids include: calcium carboxymethylcellulose, pectin, gelatin, high molecular weight carbowax, carboxypolymethylene, polyvinyl alcohol and guar gum. Natural tackifiers include bentonite clay-based tackifiers, polysaccharides and guar gum.

Without being limited to any particular theory, the tackifier may be multi-functional. When used in forming a slurry, the tackifier coats component fibers and adds viscosity to the slurry. The coated fibers have reduced friction, particularly when preparing the slurry, thereby reducing the stress applied to the mixing machinery and promoting a substantially homogenous slurry. Furthermore, when the slurry is pumped through a hose and nozzle, friction is reduced so that an even and consistent slurry may be applied on the substrate surface having a substantially homogenous matrix. The reduced friction also extends pump life and lowers the requirement for pumping energy. The tackifier may also provide adhesion of fibers to fibers, fibers to soil and soil to soil in the substrate on the ground surface. The component fibers in the slurry lay on a soil surface while the liquid portion of the slurry penetrates to the underlying soil contributing to the binding of component fibers to soil particles, soil particles to soil particles as well as fibers to fibers. Once dried, the component fibers within the substrate are adhered together, forming a water absorbent cover that is porous and breathable and secures soil and seed that may be added in order to enhance the establishment of vegetation. The tackifier also preferably provides wet strength to the erosion control medium. In addition, the erosion control medium can be rewetted over periods of months and still retain its form. Rewetting occurs when the erosion control medium, after it has dried, is subjected to more water. Typically rewetting occurs via precipitous and/or wet weather.

When used as an additive, the stabilizers which may be included in the composition are dry or liquid blends containing for example petroleum resins, coumarone-indene resins, terpene-phenol resins and xylene/formaldehyde resins. The soil stabilizers increase water resistance of the product and reduce dust production.

Similarly, chemical and natural soil flocculants can affect soil physical properties by causing fine particles to bind together into aggregates. A proper balance is required when determining the final percentage of soil flocculation-promoting agents because some such flocculants increase salinity and if the salinity is raised too high, it causes harmful and potentially lethal effects on plants. Soil flocculation and dispersion is desirable in maintaining irrigation and promotes a natural soil texture. When utilized in combination with porous ceramic additives the composition imparts a texture which both promotes visual attenuation and retains the ability to allow water and light to penetrate and promote growth.

In one embodiment, the visual attenuation system is formulated as a slurry sprayable for hydraulic application. The visual attenuation system may be applied by various types of equipment such as pump sprayers, hydro-seeders, hydro-mulchers, water trucks, spray rigs and other apparatus' capable of mixing and maintaining consistent and uniform slurry while evenly applying the slurry at a consistent and even rate. The visual attenuation system should be applied to relatively dry terrain to promote adherence and drying. The amount utilized is dependant upon the amount necessary to provide the desired color. An additional application may be required after drying to obtain the best available match.

The visual attenuation system may be applied directly to the landscape such as a soil surface. It is also useful as a complement to cover soil treatments including hydraulically applied erosion control mulches, rolled erosion control blankets, turf reinforcement mats and other surface applied treatments used to combat erosion and facilitate vegetative establishment. The visual attenuation system may also be pre-mixed, prior to application, with other landscaping materials including hydroseeding/hydromulching compounds, erosion control blankets, geotextiles, fertilizers, weed control agents, growth promoting agents, compost, manure, pesticides and other organic or agricultural by-products such as straw or hay. The later composition is recommended for smaller projects because of the cost associated with the higher pigment-to-material ratio. Generally, the more absorbent the material to be visually modified, the higher the ratio of pigment-to-material required in the visual attenuation system.

The visual attenuation system should be applied as necessary to ensure retention of the proper color match as vegetation and plants become established. The service life of the visual attenuation system will be influenced by a variety of environmental factors such as soil type, moisture, temperature, incoming solar radiation, shading, microbial activity, and snow cover. In addition, human-influenced factors such as degree of disturbance, soil preparation, erosion control practices, revegetation techniques and desired appearance will also dictate rate and frequencies of reapplication.

The visual attenuation composition is provided with sufficient colorfastness properties that the visual attenuation composition remains for stays a predetermined amount of time at a desirable color, following application. In some instances, the desirable color is a shade of green that visually approximates the surrounding terrain. It is appreciated that the color fastness properties may be implemented for any suitable amount of time dependent upon specific applications at hand.

Any suitable methods may be used to impart and or enhance the colorfastness properties of the visual attenuation compositions as applied. In one embodiment, the colorant of the visual attenuation composition contains a dye that has certain affinity for the substrate to be applied to. By way of example, the substrate includes erosion control mats, erosion control tubes, sprayable mulch products, paper, wood, general cellulose fibers, and combinations thereof. A non-limiting list of dyes includes acid dyes, basic dyes, vat dyes, mordant dyes, reactive dyes, disperse dyes, azo dyes, and sulfur dyes.

Acid dyes are water-soluble anionic dyes that are applied to fibers such as silk, wool, nylon and modified acrylic fibers. Attachment to the fiber is attributed, at least partly, to salt formation between anionic groups in the dyes and cationic groups in the fiber. Basic dyes are water-soluble cationic dyes often used on acrylic fibers, cotton, paper, wool, silk, and nylon. Vat dyes are generally insoluble in water and renders affinity for textile fibers when present in an alkaline condition. Reactive dyes become attached to natural fibers by forming covalent bonds. Disperse dyes are substantially water insoluble. When present in an elevated temperature, the disperse dyes are often used to dye nylon, cellulose triacetate, and acrylic fibers.

By employing different types of dyes, optionally in concert with a particular choice of pigment, the visual attenuation composition can be formulated to impart variable colors and or colorfastness as desirable.

In some instances, a mordant is used to impart certain light fastness properties to the visual attenuation composition as applied. Mordant dyes require a mordant, which improves the fastness of the dye against water and light. The choice of mordant is very important as different mordants can change the final color significantly. Most natural dyes are mordant dyes. One example of a mordant is potassium dichromate. Without being limited to any particular theory, a mordant helps on colorfastness by forming an insoluble compound with the colorant such as a dye, a pigment, or both. A non-limiting list of mordants includes tannic acid, alum, chrome alum, sodium chloride, and certain salts of aluminum, chromium, copper, iron, potassium, sodium and tin. All these are well known to one skilled in the arts of dyes and dyeing techniques.

The mordant can be supplied separately from and combined with the colorant including dyes and or pigments prior to application. The mordant can also be supplied together with the colorant depending on the substrate type. Metallic mordants are soluble in water and are loosely held by the paper and cotton fibers. The paper and cotton fibers are first treated with oil or tannic acid, then with a solution of mordant, and then followed by the dye and pigment composition.

When a pigment is used as the colorant described herein, the pigment is supplied to an amount of 3 to 75 lbs, preferably 5 to 66 lbs, and more preferably 10 to 45 pounds (lbs) per ton of the total weight of the final product.

The dyes and pigments may be natural or synthetic. Non-limiting examples of the pigments include various iron oxides, carbon, and titanium dioxide. Other colorants that may be used include tannins, vegetable tints, other natural colorants derived from plants, synthetic dyes, food colorings, and the like. Preferably, the colorants are non-toxic. A colorant may be used individually or blended with another colorant to obtain any desired color. The water-based medium may be provided to the visual attenuation composition as a liquid carrier or solvent, to help suspending, dispersing or stabilizing the colorant for application. The colorant includes any number of suitable dyes. Common colors for the colorant may comprise green to simulate grass or pink to simulate a flower bed. Of course, depending on the application, different color colorant can be utilized to achieve a particular effect. The color of the colorant generally does not have an effect on the performance of the mulch; rather the dye facilitates an aesthetic appearance.

The visual attenuation composition can be formulated to impart a shade of green to the substrate when applied. Green is a color, the perception of which is evoked by light having a spectrum dominated by energy with a wavelength of about 520-570 nanometers. Pigment and dyes, alone or in combination, that impart the color of green can be derived from green minerals, including the emerald, chromium oxide, copper carbonate, oxidized cobalt and zinc. Some minerals reflect the color green, rather than emitting it through luminescent or phosphorescent qualities.

Optionally, the visual attenuation composition is formulated as sprayable foam. When supplied as a foam, the visual attenuation composition is applied onto the substrate as a surface coating. This reduces cost, weight and subsequent drying time. Alternatively, the colorant is supplied as an aqueous mist, a dispersion, or a slurry.

Non-limiting examples of the substrate to which the visual attenuation composition can be applied include: mulch, sand, gravel, rocks or stone, pavers or concrete blocks, slag, soil, leaves, fertilizer (including commercial synthetic fertilizer (NPK) and pelletized sewage sludge and/or animal waste), compost, aggregates, quartzite, lava rock, grass/turf, peat moss, and particularized rubber or other polymeric material. Mulch may be virgin or recycled materials, and may include, for example, wood chips, wood shavings or fibers (including particularized wood waste and green wood), sawdust, pine needles, bark, paper, straw, bagasse, leaves, wheat and oat hulls, rice waste product, palm tree waste, palmetto, bamboo, food or vegetable-derived mulches, polymeric materials, other botanical or agricultural waste products, and combinations thereof.

A surfactant is used to reduce the surface tension of the visual attenuation composition as applied. The surfactant optionally has a foam-forming behavior. Non-limiting examples of the foam-forming surfactant include anionic surfactants, but some cationic and non-ionic materials also foam well. In general, the anionic materials are less expensive. When making foam with only water, anionic surfactants can be used at low concentrations, preferably in the range of 1000 ppm to 2000 ppm actives, with a minimum concentration of usually about 200 ppm and a maximum concentration limited only by the solubility of the surfactant being used. When additional non-foaming ingredients are added to a foaming system, for instance, pigments, polymer, dispersants, and other water insoluble materials, in general, the concentration of surfactant may need to be increased and the type of surfactant altered to support the extra materials in the composition.

Figure 1:
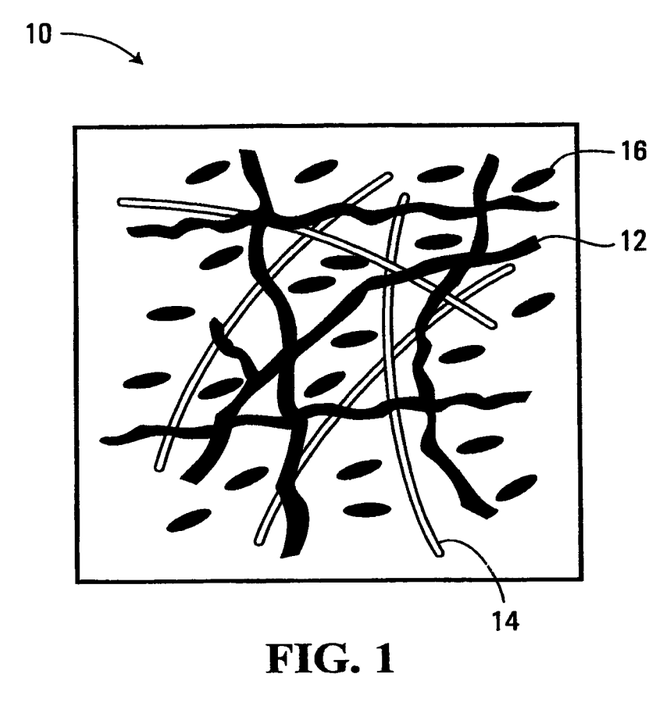
FIG. 1 illustrates a blended mulch product as described herein.
Figure 2:
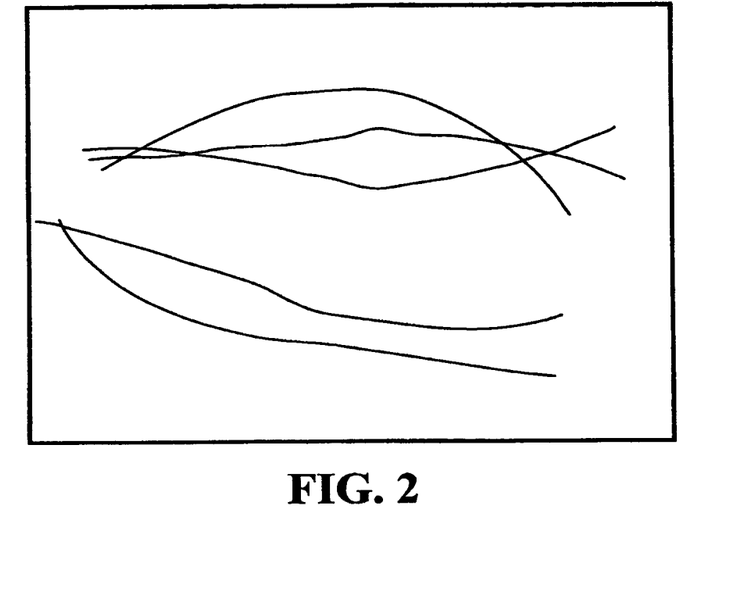
FIG. 2 illustrates one example of monofilament synthetic fibers as described herein.
Figure 3:
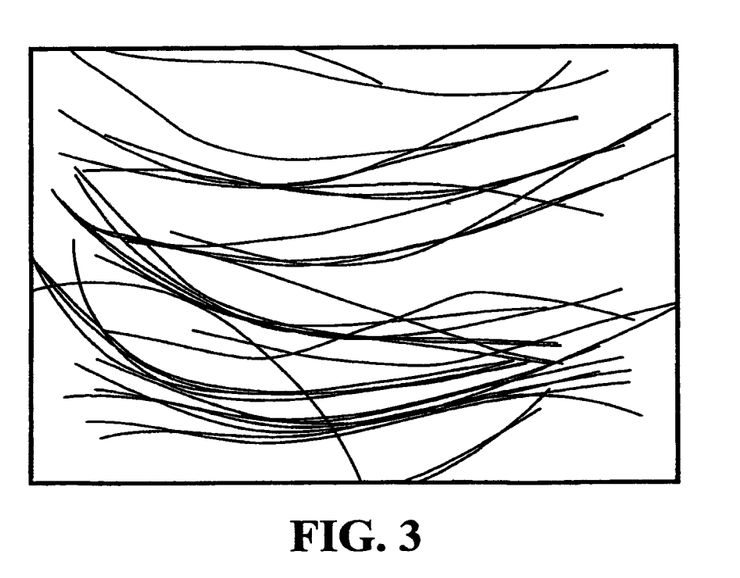
FIG. 3 illustrates another example of monofilament synthetic fibers as described herein.

According to at least another aspect of the present invention, and as shown in FIG. 1, there is provided a visually attenuated blended mulch product 10 containing three components: ligno-cellulosic fibers 12, optionally substantially straight synthetic fibers 14, and a tackifier 16. The blended mulch product 10 is visually attenuated using methods described herein. The blended mulch product 10 may be colored with the visual attenuation composition during manufacture and thereafter packaged for later use. Alternatively, the blended mulch product 10 may be provided as non-colored packages during manufacture and are combined with the visual attenuation composition described herein prior to use at the application site. The blended mulch product 10 can be mixed with water and spray-applied to a ground surface to form an erosion control medium 18.

For the purposes of this specification, the term "substantially straight" means, when referring to a fiber, that the fiber may be straight or may be slightly bowed, slightly bent or contain some curvature. Substantially straight fibers do not have intentionally imparted sharp bends along the length of the fiber when manufactured. Bowing, bending or curving of the substantially straight synthetic fibers is not likely to be regular, unlike crimped synthetic fibers, which have intentionally imparted bends, that are typically sharp and regular in nature.

The ligno-cellulosic fibers 12 form a predominant component in the blended mulch product 10, comprising about 75% to about 92% by weight of the blended mulch product 10. The high concentration of ligno-cellulosic fibers 12 provides the erosion control medium 18 (e.g. a mulch matrix or mat product) with a large water holding capacity, to absorb water and discourage the saturation of the underlying soils. Preferably, the ligno-cellulosic fibers 12 comprise about 80% to about 90%, about 85% to about 89%, or at about 87%, by weight of the blended mulch product 10.

The tackifier 16 comprises between about 8% by weight to about 12% by weight of the blended mulch product 10 described herein. In the first embodiment, the tackifier 16 component is preferably a blended, cross-linked, hydrocolloid-based binder with mineral activators. A hydrocolloid is a substance that is capable of forming a gel with water. Macromolecules, such as carbohydrate polymers (e.g. polysaccharides such as cellulose and starch) or a protein, that are water soluble are general examples of hydrocolloids. Specific examples of hydrocolloids include: calcium carboxymethylcellulose, pectin, gelatin, high molecular weight carbowax, carboxypolymethylene, polyvinyl alcohol and guar gum. Natural tackifiers include bentonite clay-based tackifiers, polysaccharides and guar gum.

The substantially straight synthetic fibers 14 comprise about 1% by weight to about 10% by weight of the blended mulch product 10. Larger concentrations of the substantially straight synthetic fibers 14 are less desirable since the substantially straight synthetic fibers 14 do not have a high water holding capacity. Preferably, the substantially straight synthetic fibers 14 comprise about 1% to about 7%, about 2% to about 4%, or at about 3%, by weight of the blended mulch product 10.

Preferably, the substantially straight synthetic fibers 14 are each monofilament fibers that are sufficiently resistant to crimping so as not to promote fiber entanglement in the blended mulch product 10. Monofilament fibers are fibers consisting of only a single strand and not a twisted or braided plurality of strands. Fiber entanglement is not promoted when a fiber is able to mix and move within the blended mulch product without generally interlocking with other fibers. That is when a substantially straight synthetic fiber 14 interacts with another fiber, interlocking typically does not occur and the substantially straight synthetic fiber 14 is capable of movement within the mulch product independent of the other fibers. Two substantially straight synthetic fibers 14 are not capable of interlocking with one another, since there are no sharp bends or branches with which to interlock. The branched and bent nature of the ligno-cellulosic fibers 12 may interlock other fibers, including substantially straight synthetic fibers 14. However, since the substantially straight synthetic fibers 14 are resistant to sharp, regular bends, they allow the ligno-cellulosic fibers 12 to move along or proximate to the length of the elongated portion of a substantially straight synthetic fiber 14 unimpeded by sharp bends, thereby avoiding further fiber entanglement that would otherwise arise if one were to use crimped synthetic fibers instead of the substantially straight synthetic fibers 14. In this way, the substantially straight synthetic fibers 14 enable one to avoid clumping of fibers when the substantially straight synthetic fibers 14 are mixed with ligno-cellulosic fibers 12 and tackifier 16 to form a preferably homogenous blend.

The substantially straight synthetic fibers 14 are manufactured to be sufficiently short in length so as to reduce or minimize additional entanglement of fibers in the blended mulch product 10. Each fiber has an elongated portion, which is the portion of the fiber that has the largest or longest distance measurement. The substantially straight synthetic fibers 14 preferably each have a length along their elongated portion in the range of about 0.25 inches to about 3 inches. More preferably yet, the substantially straight synthetic fibers 14 have a length in the range of about 0.3125 inches to about 1 inch, and even more preferably yet in the range of about 0.375 inches to about 0.625 inches. The substantially straight synthetic fibers 14 typically have a denier measurement in the range of about 4 denier to about 8 denier, preferably in the range of about 4.5 denier to about 7.5 denier and more preferably about 6 denier.

The substantially straight synthetic fibers 14 each have a maximum potential length that can be measured by measuring the distance ($D_{max}$) between two end points located at opposing ends of the elongated portion of the substantially straight synthetic fiber 14 when the fiber is completely straight. $D_{max}$ also referred to herein as the maximum potential distance. In this way, with any particular synthetic fiber, having a first end point and a second end point, with the first end point and the second end point located at opposing ends of the elongated portion of the particular synthetic fiber, the maximum potential distance ($D_{max}$) can be measured along the elongated portion of the particular synthetic fiber when the particular synthetic fiber is completely straight.

The substantially straight synthetic fibers will typically have some bowing, bending or curvature along their length when used in the blended mulch product and the erosion control medium contemplated herein. However, preferably when used in the blended mulch product and the erosion control medium, the shortest notional straight-line distance between the aforementioned first and second end points, located at opposing ends of the elongated portion of the applicable synthetic fiber, will be at least about 60% of the distance between the first and second end points when the synthetic fiber is completely straight. The shortest notional straight-line distance is the distance between the first and second end points of the applicable synthetic fiber as measured along a notional straight line between the first and second end points, when the applicable synthetic fiber is at least substantially straight, but not necessarily completely straight. The shortest notional straight-line distance is also referred to herein as the notional shortest distance ($D_{not}$).

The ratio between the notional shortest distance and the maximum potential distance can be used as a measure of the degree of straightness of the fiber. This ratio is termed the straight ratio of the fiber ($D_{not}:D_{max}$), also referred to as a "straight fiber ratio". When the straight ratio is 1:1 the applicable synthetic fiber is completely straight and therefore has equal $D_{not}$ and $D_{max}$ values.

Preferably, the straight ratio of substantially straight synthetic fibers 14 is between about 3:5 to about 1:1. More preferably, the straight ratio of substantially straight synthetic fibers 14 is between about 13:20 to about 1:1. More preferably still, the straight ratio of substantially straight synthetic fibers 14 is between about 7:10 to about 1:1. More preferably still, the straight ratio of substantially straight synthetic fibers 14 is between about 3:4 to about 1:1. More preferably still, the straight ratio of substantially straight synthetic fibers 14 is between about 4:5 to about 1:1. More preferably still, the straight ratio of substantially straight synthetic fibers 14 is between about 17:20 to about 1:1. More preferably still, the straight ratio of substantially straight synthetic fibers 14 is between about 9:10 to about 1:1. More preferably still, the straight ratio of substantially straight synthetic fibers 14 is between about 19:20 to about 1:1.

The amount of substantially straight synthetic fibers 14 that are used to make a blended much product 10 or are in a blended mulch product 10 or are in an erosion control medium 18 that have a preferred straight ratio may also vary.

In one aspect, preferably at least 60%, 65%, 70%, 75%, 80%, 85%, 90%, or 95% of the substantially straight synthetic fibers 14 have a straight ratio of between about 3:5 and about 1:1. In certain instances, preferably at least 60%, 65%, 70%, 75%, 80%, 85%, 90%, or 95% of the substantially straight synthetic fibers 14 may have a straight ratio of between about 13:20 and about 1:1. In certain other instances, preferably at least 60%, 65%, 70%, 75%, 80%, 85%, 90%, or 95% of the substantially straight synthetic fibers 14 may have a straight ratio of between about 7:10 and about 1:1. In certain other instances, at least 60%, 65%, 70%, 75%, 80%, 85%, 90%, or 95% of the substantially straight synthetic fibers 14 may have a straight ratio of between about 3:4 and about 1:1. In certain other instances, at least 60%, 65%, 70%, 75%, 80%, 85%, 90%, or 95% of the substantially straight synthetic fibers 14 have a straight ratio of between about 4:5 and about 1:1. In certain other instances, preferably at least 60%, 65%, 70%, 75%, 80%, 85%, 90%, or 95% of the substantially straight synthetic fibers 14 may have a straight ratio of between about 17:20 and about 1:1. In certain other instances, preferably at least 60%, 65%, 70%, 75%, 80%, 85%, 90%, or 95% of the substantially straight synthetic fibers 14 may have a straight ratio of between about 9:10 and about 1:1. In certain other instances, preferably at least 60%, 65%, 70%, 75%, 80%, 85%, 90%, or 95% of the substantially straight synthetic fibers 14 may have a straight ratio of about 1:1.

The substantially straight synthetic fibers 14 preferably have a greater stiffness and resistance to crimping than the ligno-cellulosic fibers 12 that also form part of the blended mulch product 10. Stiffness and resistance to crimping is promoted through the use of substantially straight synthetic fibers 14 manufactured to have certain characteristics with respect to one or more properties, in particular with respect to one or more of the following: flexural modulus (psi), and tensile modulus (psi). Preferably, at least two of these properties have minimum characteristics to promote stiffness and resistance to crimping.

Tensile modulus, and flexural modulus are properties well known to one skilled in the art. In the first embodiment, tensile modulus is measured in accordance with ASTM Standard D638 titled "Standard Test Method for Tensile Properties of Plastics", published by ASTM International (www.astm.com). As well, in the first embodiment, the flexural modulus is a flexural property measured in accordance with ASTM Standard D790 titled "Standard Test Methods for Flexural Properties of Unreinforced and Reinforced Plastics and Electrical Insulating Materials", published by ASTM International.

In one variation, preferably the substantially straight synthetic fibers 14 used for the blended mulch product 10 have a minimum tensile modulus value of about 60,000 psi, a minimum flexural modulus value of about 80,000 psi, or both.

The tensile modulus of a substantially straight synthetic fiber 14 suitable for use in blended mulch products 10 and erosion control mediums 18 described herein may range from about 60,000 psi or higher. Preferably substantially straight synthetic fibers 14 have a tensile modulus of at least about 60,000 psi and more preferably between about 85,000 psi to about 350,000 psi, about 90,000 psi to about 200,000 psi, 100,000 psi to about 210,000 psi, 110,000 psi to about 220,000 psi, 120,000 psi. to about 230,000 psi, about 130,000 psi to about 240,000 psi, about 140,000 psi to about 250,000 psi, about 150,000 psi to about 260,000 psi, about 160,000 psi to about 270,000 psi, about 170,000 psi to about 280,000 psi, about 180,000 psi to about 290,000 psi, about 190,000 psi to about 300,000 psi, about 200,000 psi to about 310,000 psi, about 210,000 psi to about 320,000 psi, about 220,000 psi to about 330,000 psi, about 220,000 psi to about 340,000 psi, about 230,000 psi to about 350,000 psi, about 240,000 psi to about 360,000 psi, about 250,000 psi to about 370,000 psi, about 260,000 psi to about 380,000 psi, about 270,000 psi to about 390,000 psi, about 280,000 psi to about 400,000 psi, about 290,000 psi to about 410,000 psi, about 300,000 psi to about 420,000 psi, about 310,000 psi to about 430,000 psi, about 320,000 psi to about 440,000 psi, about 330,000 psi to about 450,000 psi, about 340,000 psi to about 460,000 psi, about 350,000 psi to about 470,000 psi, or about 360,000 psi to about 480,000 psi.

The flexural modulus of a substantially straight synthetic fiber 14 suitable for use in blended mulch products 10 and erosion control mediums 18 described herein may range from about 80,000 psi or higher. Preferably substantially straight synthetic fibers 14 have a flexural modulus of at least about 80,000 psi and more preferably between about 130,000 psi to about 300,000 psi, about 140,000 psi to about 310,000 psi, about 150,000 psi to about 320,000 psi, about 160,000 psi to about 330,000 psi, about 170,000 psi to about 340,000 psi, about 180,000 psi to about 350,000 psi, about 190,000 psi to about 360,000 psi, about 200,000 psi to about 370,000 psi, about 210,000 psi to about 380,000 psi, about 220,000 psi to about 390,000 psi, about 230,000 psi to about 400,000 psi, about 240,000 psi to about 410,000 psi, about 250,000 psi to about 420,000 psi, about 260,000 psi to about 430,000 psi, about 270,000 psi to about 440,000 psi, about 280,000 psi to about 450,000, about 290,000 psi to about 460,000 psi, or about 300,000 psi to about 470,000 psi.

In certain particular instances, the substantially straight synthetic fibers 14 used to form the blended mulch product 10 are polypropylene monofilament fibers. In another variation, other substantially straight synthetic fibers 14 that exhibit desirable properties as described herein may be used provided they are resistant to crimping and maintain their substantially straight form in the blended mulch product. Such substantially straight synthetic fibers 14 are often thermoplastics. A thermoplastic is a plastic which may be softened by heat and hardened by cooling in a reversible physical process. Other suitable substantially straight synthetic fibers 14 may include, by way of illustration, substantially straight polyolefins, polyesters and/or polyamide fibers (e.g. nylon).

The physical nature of the substantially straight synthetic fiber 14 (e.g. polypropylene) results in the substantially straight synthetic fiber 14 being hydrophobic. As a result, the substantially straight synthetic fiber 14 does not impart additional water holding capacity to the erosion control medium 18, rather the hydrophobicity of the substantially straight synthetic fiber 14 will keep the substantially straight synthetic fiber 14 stiff, not limp and will impart greater wet strength to the erosion control medium 18 when rewetted. Furthermore, the shorter substantially straight synthetic fibers 14, being resistant to bending, are resistant to compression and provide greater volume within the 3-dimensional erosion control medium 18 due to their substantially straight nature and the flexural and tensile properties described above.

In certain particular instances, the substantially straight synthetic fibers 14 used for the blended mulch product 10 are polypropylene monofilament fibers that have a minimum tensile modulus value of about 220,000 psi, a minimum flexural modulus value of about 200,000 psi, or both.

Such polypropylene monofilament fibers are available from ABC Fibers, a division of Alabama Bag Co., LLC of 300 M. H. Williams Dr., Helena Industrial Park, Helena, Ala. 35080.

In certain particular instances, the substantially straight synthetic fibers used to form blended mulch products 10 are a polyolefin. Suitable examples of polyolefins include polypropylenes and polyethylenes. In certain other particular instances, the substantially straight polypropylene fibers used to form blended mulch products 10 are of a particular grade of polypropylene. Preferably, the polypropylene fibers are made from extrusion grade polypropylene. In certain yet other instances, the substantially straight synthetic fibers 14 may be made from polyethylenes. A specific, non-limiting example of a suitable polyethylene is high density polyethylene. Polyethylenes and polypropylenes used to make substantially straight synthetic fibers 14 for use in blended mulch products 10 may be made using any particular starting monomer/monomers, as is understood to one of skill in the art. In yet other instances, the substantially straight synthetic fibers 14 may be made from a polyester. A specific example, for the purpose of non-limiting illustration, of a polyester that may be used to make substantially straight synthetic fibers 14 for use in blended mulch products 10 include unrefined polyethylene terephthalate. In yet other instances, the substantially straight synthetic fibers 14 may be made from nylon. In yet other instances, the substantially straight synthetic fibers 14 comprise a mixture of different polypropylenes, polyamides, polyesters, polyethylenes, and nylons, including and/or excluding any of these types of fibers from the mixture are provided.

Table 1 below illustrates some of the inherent mechanical properties measured using ASTM standards 638 and 790 of some non-limiting examples of synthetic polymers that are commercially available and that may be used to make substantially straight synthetic fibers 14 for use in blended mulch products 10.

TABLE 1

| Synthetic | Tensile Modulus (psi) | Flexural Modulus (psi) |
| --- | --- | --- |
| Extrusion Grade Polypropylene | about 220,000 to about 250,000 | about 135,000 to about 300,000 |
| Nylon | about 50,800 to about 430,000 | about 63,800 to about 425,000 |
| High Density Polyethylene | about 116,000 to about 144,000 | about 72,500 to about 222,000 |
| Unrefined Polyethylene Terephthalate (Overview) | about 358,000 to about 435,000 | about 145,000 |

The substantially straight synthetic fibers 14 add physical strength and stiffness to the erosion control medium 18 (e.g. mat product/mulch matrix), particularly when rewetted and improve the impact resistance of the erosion control medium 18 to the rain. The substantially straight synthetic fibers 14 also preferably increase the loft within the erosion control medium 18, providing improved shock absorbency and increased aeration within the erosion control medium 18.

The presence of the substantially straight synthetic fibers 14 preferably does not result in an increase in dry tensile strength of the erosion control medium 18 as compared to an erosion control medium without the substantially straight synthetic fibers 14. Measuring dry tensile strength is within the knowledge of a person of skill in the art. An example of how to measure the dry tensile strength of an erosion control medium is also described in Example 1.

More preferably, the presence of the substantially straight synthetic fibers 14 in the blended mulch product 10 increases the wet tensile strength of the erosion control medium 18 formed from the blended mulch product 10 as compared to an erosion control medium formed from blended mulch product without the substantially straight synthetic fibers 14. Measuring wet tensile strength is within the knowledge of a person of skill in the art. An example of how to measure the wet tensile strength of an erosion control medium is also described in Example 2.

Preferably, when the substantially straight synthetic fibers 14 are resistant to crimping, their inclusion in the blended mulch product 10 increases the modulus of elasticity of the erosion control medium 18 formed from the blended mulch product 10 as compared to an erosion control medium form from a blended mulch product without the substantially straight synthetic fibers 14. Measuring the modulus of elasticity is within the knowledge of a person of skill in the art. An example of how to measure the modulus of elasticity of an erosion control medium is described in Example 3. Preferably, the average modulus of elasticity of samples of an erosion control medium 18 formed from the blended mulch product 10 of the first embodiment will be at least about 11,500 psi. More preferably, the average modulus of elasticity of samples of the erosion control medium 18 formed from the blended mulch product 10 will be at least about 13,000 psi. More preferably yet, the average modulus of elasticity of samples of the erosion control medium formed from the blended mulch product 10 will be at least about 14,000 psi.

Figure 4:
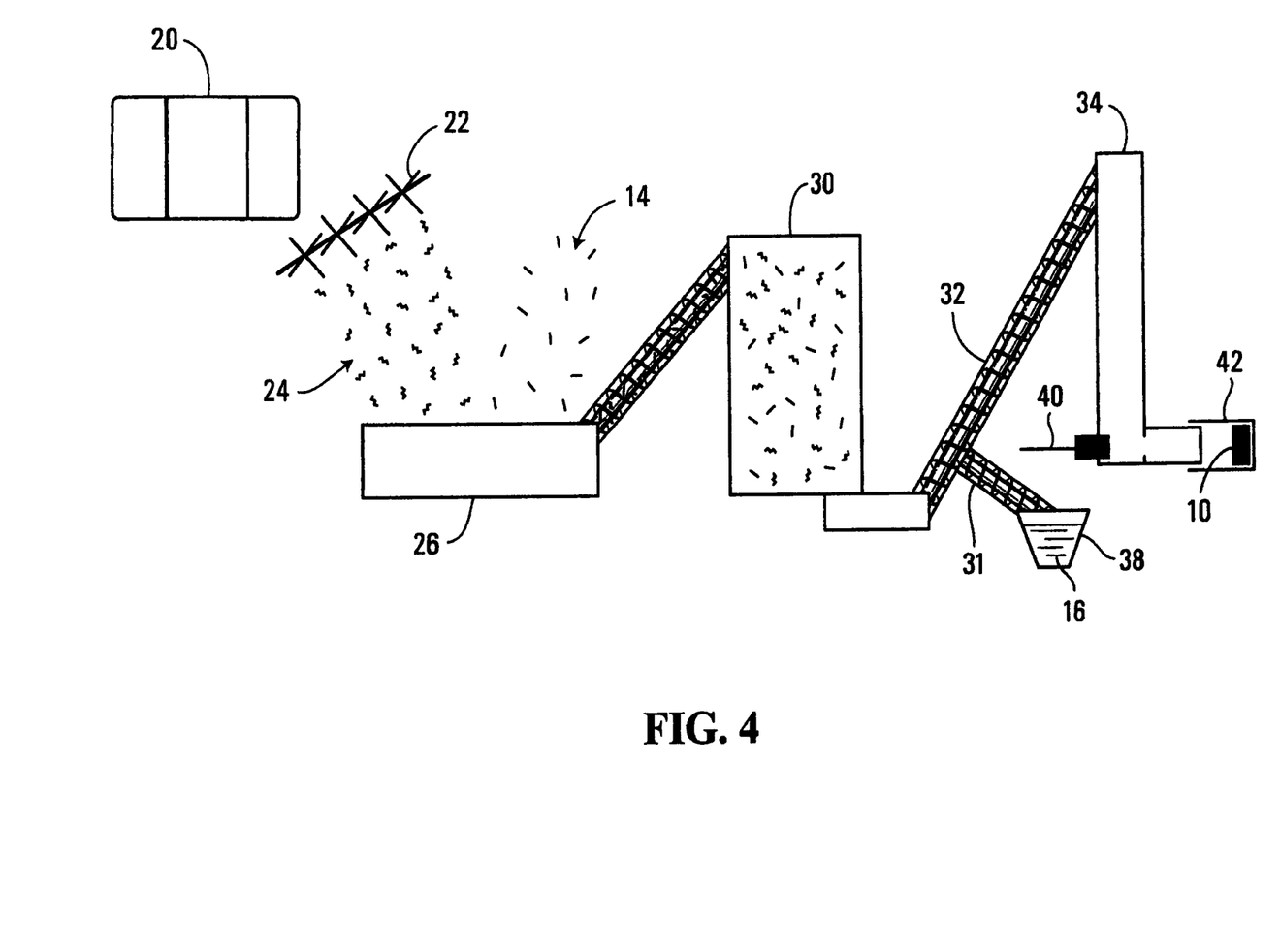
FIG. 4 illustrates a method of producing a blended mulch product as described herein.

FIG. 4 illustrates a typical method for preparing and packaging of the blended mulch product 10 (in FIG. 1). Compacted baled, ligno-cellulosic fibers 20 are placed on a conveyor (not shown) and opened with a bale breaker 22. Fluffed ligno-cellulosic fibers 24 are augered into a fluffing bin 26 to continue to open the ligno-cellulosic fibers. Substantially straight synthetic fibers 14 are then added and augered together with the fluffed ligno-cellulosic fibers 24 into a fluffing bin 30. Augering helps to blend the different types of fibers together. The mixed fiber is then conveyed with a larger auger 32 to the top of a holding tower 34. Tackifier 16, held in a tackifier hopper 38, is metered into the large auger 32 via a small auger 31. Substantial mixing occurs in the large auger 32. The holding tower 34 holds the blended mulch product 10 and gravity feeds the blended mulch product 10 to a packaging ram 40. The packaging ram 40 plunges and compresses the blended mulch product 10 thereby packaging the blended mulch product 10 in a bag 42.

Such a packaging procedure with mechanical mixing of the components of the blended mulch product 10 helps to thoroughly mix the individual fibers and tackifier 16 so that the blended mulch product 10 is substantially homogeneous. The substantially straight synthetic fibers 14 are advantageous since they will slide and mix more effectively with the refined wood fibers, resulting in a more homogeneous blend.

The dry blending of the components (the ligno-cellulosic fibers 12, the substantially straight synthetic fibers 14 and the tackifier 16) can affect the performance characteristics of the slurry and erosion control medium 18 once the blended mulch product 10 is mixed with water and applied. Mechanical blending provides a suitable dispersion of the components within the blended mulch product 10, reducing or preventing clumping of fibers (e.g. due to entanglement) and reducing or preventing uneven dispersion of the tackifier 16. Clumping of fibers and/or uneven dispersion of the tackifier 16 in the slurry can cause machinery used, such as a hydroseeder, to apply the slurry to a surface to clog or breakdown. Clumping of fibers and/or uneven dispersion of the tackifier 16 can result in weak spots in the erosion control medium 18 formed using the blended mulch product 10. Use of the substantially straight synthetic fibers 14 in the blended mulch product 10 also helps minimize the risk of clumping of the substantially straight synthetic fibers 14 which can occur if one were to use crimped synthetic fibers.

Blended mulch products 10 described herein are formed into slurries by the addition of water. Optionally, other materials such as seeds, fertilizers, lime and other additives may also be added to blends or slurries, prior to the addition of water or after the addition of water, when preparing slurries. Typical ratios of water to blend (water:blend) that are used to prepare slurries described herein are shown, for illustration purposes only, in Table 2 below.

TABLE 2

| Tank Size (US gal.) | Blended Mulch (lb) | Water (US gal.) |
| --- | --- | --- |
| 900 | 300 | 820 |
| 1200 | 400 | 1090 |
| 1700 | 566 | 1550 |
| 2500 | 833 | 2270 |
| 3300 | 1100 | 3000 |

A slurry may be spray applied to the desired ground surface in order to dry into an erosion control medium 18. Typical hydroseeding apparatus known in the art is suitable for use with slurries described herein. When sprayed on the ground surface, the slurry is preferably applied so that it forms a layer that is at least about 0.125 inches (or 3 mm) thick, although any layer that is between about 0.1 inches and about 0.2 inches in thickness will provide reasonable erosion control mediums 18 while allowing revegetation. More preferably, the slurry forms a layer that is at least about 0.12 inches thick. Preferably, to minimize shadowing caused by uneven soil surfaces, at least two applications of the slurry are spray-applied to the ground surface where each application is carried out in a different direction. A preferred nozzle for finishing the application of slurries described herein to form erosion control mediums 18 described herein is a fan nozzle.

Figure 5:
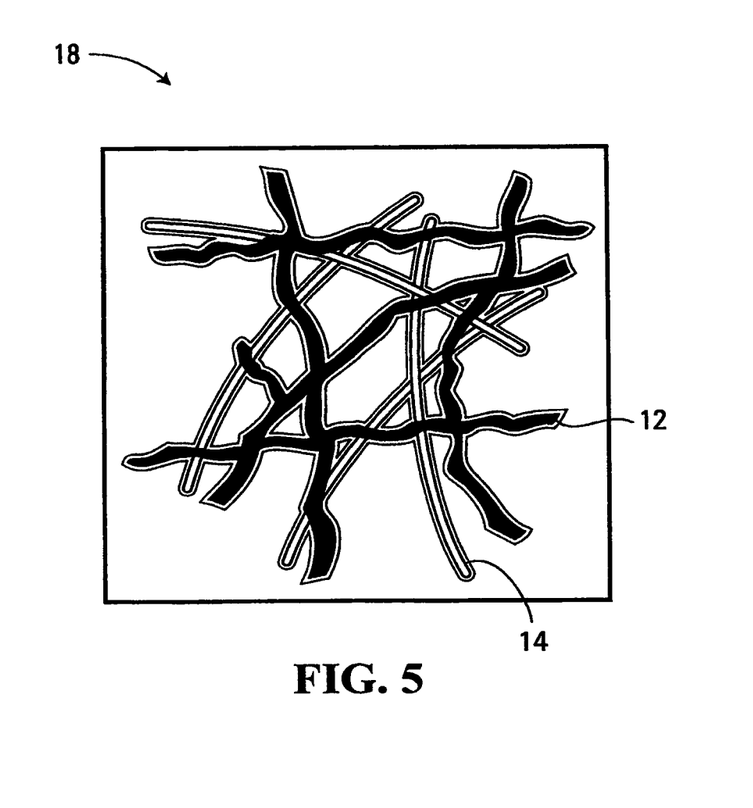
FIG. 5 illustrates the blended mulch product of FIG. 1 after being slurried and having dried into an erosion control medium as described herein.

Referring to FIG. 5, an erosion control medium 18 is formed on a ground surface from the blended mulch product 10 once the blended mulch product 10 is mixed with water to form a slurry which is then spray-applied to the ground surface and allowed to dry. The ground surface may be any surface which one may want to protect from erosion or any surface on which one may want to help establish vegetation. The surface may be an indoor surface or an outdoor surface.

The erosion control medium 18 forms a protective layer above the ground surface. Once the spray-applied slurry dries on the ground surface, the fibers that formed part of the slurry adhere together, forming the erosion control medium 18 that provides a protective layer that is water absorbent, porous, breathable, secures soil and promotes the establishment of vegetation. The erosion control medium 18 that forms has an open weave three-dimensional morphology that will often adhere intimately with the ground surface and bind soil particles to the fibers making up the erosion control medium 18. The open weave morphology of the erosion control medium 18 promotes germination and rooting of seedlings, and in so doing preferably promotes a moist environment and enhanced soil temperatures. The erosion control medium 18 also protects the ground surface from the impact of rain and the effect of wind velocity. The erosion control medium 18 is typically water insoluble when rewetted due to precipitation.

Figure 6:
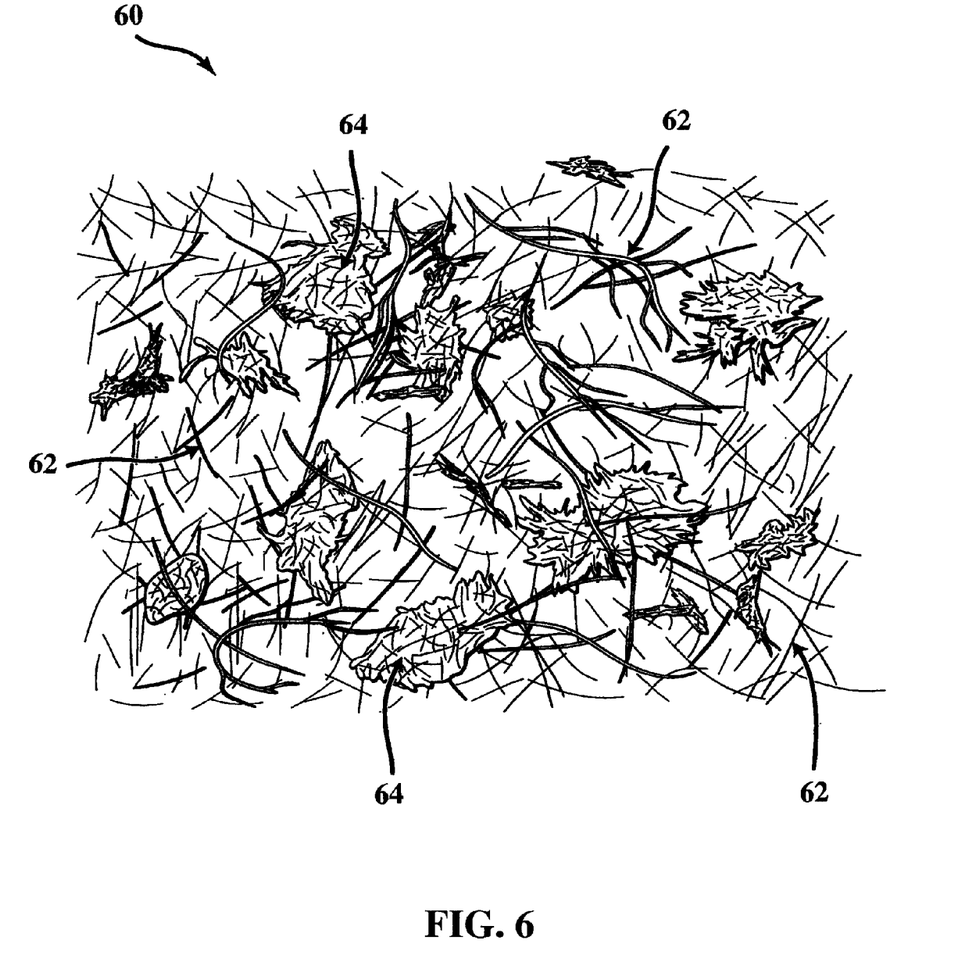
FIG. 6 is a schematic diagram of ligno-cellulosic fibers combined with wood-based flakes, as described herein.

According to at least one aspect of the present invention, as illustratively shown in FIG. 6, there is provided a blended mulch product 60 having ligno-cellulosic fibers 62 and wood-based flakes 64. In certain variations, the ligno-cellulosic fibers 62 and or the wood-based flakes 64 are treated with one or more additives, such as a dye or a surfactant, as discussed below. The blended mulch product 60 may be visually attenuated using methods described herein. The blended mulch product 60 may be colored with the visual attenuation composition during manufacture and thereafter packaged for later use. Alternatively, the blended mulch product 60 may be provided as non-colored packages during manufacture and are combined with the visual attenuation composition described herein prior to use at the application site. The blended mulch product 60 can be mixed with water at a high loading rate to form a slurry that can be pumped through a hose and sprayed onto a surface to form a three-dimensional mulch matrix that provides good coverage of the surface.

The ligno-cellulosic fibers 62 comprise in the range of about 20% to about 80%, about 35% to about 65%, about 45% to about 55%, or about 50% by weight of the blended mulch product 60. The ligno-cellulosic fibers 62 assist in providing a mulch matrix with a large water holding capacity, to absorb water and discourage the saturation of the underlying soils.

The ligno-cellulosic fibers 62 are preferably thermomechanically refined wood fibers in the first embodiment, which have been dried to a moisture content of no more than about 9% to about 15%, and which have a bulk density, on an oven-dried basis, of about 0.11 to about 0.15 grams per cubic centimeter. Thermomechanical processes used to produce thermomechanically refined wood fibers are well known in the art. In alternative variations, other ligno-cellulosic fibers 62 may be used, and preferably they also will be thermomechanically processed to destroy fungi, nematodes and other unwanted organisms. Sources for ligno-cellulosic fibers include, without limitation, fibers derived from softwood trees (e.g., pine, fir, spruce, Douglas fir, etc.) or hardwood trees (e.g., aspen, maple, alder, etc.). Alternative sources for ligno-cellulosic fibers also include, without limitation, sawmilling residues such as sawdust, planer shavings, recycled urban waste, post peeler shavings, pulp quality chips, pin chips and chip fines; urban waste wood, such as pallets or demolition wood; etc. Preferably a softwood chip as produced from sawmilling is used, since the resultant fiber will be longer. These source materials may be processed and refined thermomechanically to produce ligno-cellulosic fibers suitable for use in the blended mulch products of the invention.

A surfactant may also be added to the ligno-cellulosic fibers 62 after refining. Addition of a surfactant may enhance the wetting of the ligno-cellulosic fibers and allow for proper dispersion of the ligno-cellulosic fibers when mixed with water, and reduce the tendency of the fibers to float on the surface of the water in a hydromulcher tank. The surfactant can be applied to the ligno-cellulosic fibers at a concentration of about 0.02% to about 0.6% (e.g., about 0.2%). The surfactant can be a non-ionic surfactant that can be, for example, non-toxic to plant growth at the applied concentrations. Preferably, the surfactant is a polyoxypropylene-polyoxyethylene block copolymer surfactant, e.g., Pluronic™ 25R2 (BASF, Canada).

In general, the ligno-cellulosic fibers 62 used in the blended mulch product 62 each individually may have a diameter from about 0.01 mm to about 0.3 mm and a length along an elongated portion from about 0.06 inches to about 1.5 inches (about 1.5 mm to about 38 mm). The process used to manufacture the ligno-cellulosic fibers 62 determines the length of the ligno-cellulosic fibers 62.

The wood-based flakes 64 form a second component of the blended mulch product 60. In general, the wood-based flakes 64 comprise in the range of about 20% to about 80%, about 35% to about 65%, about 45% to about 55%, or at about 50%, by weight of the blended mulch product 60. The wood-based flakes 64, when combined with the lignocellulose fibers 62, provide a blended mulch product that can be mixed with water to form a slurry that can be pumped through the hose and nozzle of a hydromulching apparatus at a high weight per volume ratio.

Sources for wood-based residual material suitable to produce the wood-based flakes 62 include, without limitation, recycled or recyclable wood materials, including a by-product of sawmilling, a by-product of the planting process, or a manufactured wood composite residual. Wood-based residuals or wood residuals are chunks of wood fragments, pieces or particles that are generated in all stages of forest use, from the harvesting of trees to the final manufacturing processes. These products include panel products, furniture, and miscellaneous wood products, which in turn create their own residues. Wood residuals include sawmilling residues such as sawdust, planer shavings, post peeler shavings, lathe curls, pin chips, chip fines and chippable residue, hogged sawtrim residuals from the hardboard process or screened shavings, sander dust, veneer and plywood trims, engineered wood composite trims, hardboard, particleboard, medium or high density fibreboard, oriented strandboard, urban waste wood, such as pallets or demolition wood, etc., and any combinations thereof. In general, wood-based residuals are not subjected to processes designed to remove lignin and therefore contain lignin. These source materials may be processed by for example drying, hogging, and sizing, to produce wood-based flakes suitable for use in the blended mulch products of the invention.

In general, a substantial portion of the wood-based flakes 64 used in the blended mulch product 60 preferably each individually have a dimension (e.g., length or width) in the range of about 5 times to about 100 times, about 20 times to about 70 times, about 25 times to about 40 times, or about 25 times to about 35 times, its thickness.

In general, a substantial portion of the wood-based flakes 64 are generally thin, flake-like pieces, each preferably having a generally flat region having a two-dimensional surface area of at least about 2.5 square mm. In some embodiments, the two-dimensional surface area of the generally flat region of each of the substantial portion of the wood-based flakes 64 is no greater than about 0.5 square inch (322 square mm). In other embodiments, the two-dimensional surface area is at least about 0.004 square inches (2.5 square mm) to about 0.5 square inch (322 square mm). In general, when referring to a substantial portion of the wood-based flakes 64, about 40% to 90%, and in some embodiments preferably about 60% to 70%, of the wood-based flakes 64 have generally thin, flake-like characteristics and a generally flat region having a minimum predetermined surface area. Preferably, 40% to 75% of wood-based flakes 64 have a dimension in the range of about 0.125" to about 0.725" and a thickness of at least 0.004".

The higher loading capacity enables good surface coverage (i.e., the extent to which the ground surface is overlayed or protected by the mulch matrix) with the same amount of mulch material, once spray-applied on the ground. In some embodiments, the mulch matrices of the invention provide coverage of about 25% to about 40% greater than conventional wood or paper blended mulch product mulches. The thin, flake-like geometry of the wood-based flakes 64 aid in separating the ligno-cellulosic fibers 62 by dividing the fiber masses, and may allow the ligno-cellulosic fibers to lie generally flat on the surface to which the blended mulch product is applied, to provide the greater coverage. The elongated ligno-cellulosic fibers provide even coverage of the surface.

Mechanical blending provides a suitable dispersion of precise quantities of the ligno-cellulosic fibers 62 and wood-based flakes 64, such that the wood-based flakes 14 are mixed into and amongst the ligno-cellulosic fibers 62, reducing or preventing clumping of fibers (e.g. due to entanglement) and allowing a higher loading capacity in the slurry and greater coverage of the mulch when spray-applied to a surface. Clumping of fibers can cause machinery used to apply the slurry to a surface, such as a hydromulcher, to clog or break down. Clumping of fibers can also result in weak spots in the mulch matrix formed using the blended mulch product.

The blended mulch products described herein provide substantially homogeneous blends so that substantially homogeneous slurries may be formed. Substantially homogeneous slurries are pumpable through lengths of hosing for application to the desired ground surface. The components of the blends, each with their physical characteristics, act together, when mixed with water, to reduce the blockage of hosing and other spray apparatus and machinery, as well as reducing the disruption of application of the slurry, thereby forming a substantially homogenous mulch matrix on the ground surface. Blends described herein, when mixed with water, yield a smooth, lump-free slurry in which the various insoluble components are uniformly suspended. Slurries produced by blends described herein have a fiber lubricity (fiber-to-fiber interaction in water) that provides consistent application, can be sprayed over a greater ground surface area, and yet does not adversely run or flow when applied to a desired surface.

Blended mulch products described herein are formed into slurries by the addition of water. Optionally, other materials such as seeds, fertilizers, lime and other additives may also be added to the hydromulching tank or the slurry. Approximately about 50 pounds to about 60 pounds of the blended mulch product may be added per 100 U.S. gallons of water, although loading rates may vary depending on the type and working performance of the machine used.

Various alternative embodiments and examples of the invention are described herein. These embodiments and examples are illustrative and should not be construed as limiting the scope of the invention.

EXAMPLES

Example 1

A package of a blended mulch product containing 87% wood fiber, 3% substantially straight polypropylene monofilament fibers, and 10% tackifier, as formulated according to Example 4, is mixed, at the site of application, with copperthalocyanide (by Sun Chemical) as the colorant at a weight ratio of 15 lbs per ton of the blended mulch product. The blended mulch product mixed with the colorant is added to a hydro-seeder tank prefilled with water to form a mulch slurry. This colored mulch slurry is spray-applied to a ground surface. The color of the erosion control medium as formed from the blended mulch product is found to remain with no visible fading for a period of about 5 weeks.

Example 2

The blended mulch product used in this example is of the same composition as used in Example 1, with the exception that blended mulch product and in particular the fibers contained therein are pre-colored, at a manufacturing plant, with the copperthalocyanide as the colorant. The pre-colored blended mulch is then provided in dry product packages and is combined with water to form a sprayable slurry at the site of application. The color of the erosion control medium formed from spray-application of the blended mulch product is found to remain with no visible fading for a period of about 5 weeks.

Example 3

The color of the erosion mulch medium applied in Examples 1 and 2 is reinforced to effectuate a desirable colorfastness value of up to 6 months. In particular, a water slurry containing copperthalocyanide at a concentration of 40 pounds per ton of the water is spray-applied onto the erosion control medium as applied. The spray application is repeated once with a time interval of about 10 minutes in between the two applications. The color of the erosion control medium after the color reinforcement treatment is found to remain without noticeable fading for a period of 5 months.

Example 4

The effect of the addition of substantially straight polypropylene monofilament fibers, each having a length of about 0.5 inches, to an erosion control medium on the dry tensile strength of the erosion control medium was evaluated. Slurries made up of 50 pounds of dry blends of fibers and tackifier were mixed together with 100 US gallons of water. Samples of the slurries were applied to 8 inch×8 inch Teflon™ lined pans at a rate of 3500 pounds/acre and then placed in an oven set at 64 degrees C. until dry, to create erosion control mediums. Two types of erosion control mediums were prepared, one consisting of 90% wood fiber and 10% tackifier and another consisting of 87% wood fiber, 3% substantially straight polypropylene monofilament fibers and 10% tackifier. Individual specimens of 38 mm.times.88 mm were cut from each erosion control medium. Specimens were tested for dry tensile strength using a 4204 Instron™ testing machine with the crosshead speed set to 1 mm/min. Specific adhesive strength (SAS) was calculated by using maximum load divided by the weight of the individual erosion control medium. The averaged results, shown in Table 3, indicate that erosion control mediums without the substantially straight synthetic fibers have a higher SAS value than erosion control mediums that contain substantially straight synthetic fibers, indicating that an addition of substantially straight synthetic fiber that will not entangle with the wood fiber decreases the dry tensile strength of the erosion control medium.

TABLE 3

| Specimen | Dry Tensile SAS (N/g) |
|---|---|
| Erosion control medium without substantially straight synthetic fibers | 25.4 |
| Erosion control medium with 3% substantially straight synthetic fibers | 23.3 |

Example 5

Erosion control medium specimens were prepared as described in Example 4. Prior to testing, specimens were soaked for 30 minutes in room temperature water, and then excess water was blotted off using pulp blotters. Tensile strength testing was conducted as described in Example 4.

The averaged results of Example 5 are shown in Table 4. Wet tensile strength results of the erosion control mediums containing substantially straight polypropylene monofilament fibers were superior to the erosion control mediums without the substantially straight synthetic fibers. This indicates that the substantially straight synthetic fiber adds wet strength to the erosion control medium. Furthermore, the percentage of retained tensile strength after wetting is higher for the erosion control mediums containing substantially straight synthetic fibers than it is for erosion control mediums without substantially straight synthetic fibers.

TABLE 4

| Specimen | Wet Tensile SAS (N/g) | Percent Retained Tensile Strength |
|---|---|---|
| Erosion control medium without substantially straight synthetic fibers | 4.8 | 18.7 |
| Erosion control medium with 3% substantially straight synthetic fibers | 5.4 | 23.2 |

Example 6

Erosion control medium specimens were prepared as described in Example 4, except that the specimens were cut to 38 mm×100 mm. Erosion control medium specimens were tested flexurally using an Instron™ 4204 testing machine set at 5 mm/min and a bending jig with a span of 76.2 mm.

The averaged results are shown in Table 5. Modulus of elasticity results indicate that erosion control mediums containing substantially straight synthetic fibers have a higher stiffness than erosion control mediums without substantially straight synthetic fibers.

TABLE 5

| Specimen | Modulus of Elasticity (psi) |
|---|---|
| Erosion control medium without substantially straight synthetic fibers | 10670 |
| Erosion control medium with 3% substantially straight synthetic fibers | 14210 |

Example 7

The two types of materials used in the fiber mulch blends illustratively shown as 62 in FIG. 6 were classified based on the percentage retention on a screen mesh (Table 6) using the Ro-Tap fiber classification method. These fiber classification tests use Standard Wire mesh screen sizes, where the mesh sizes are inversely proportional to the size of the holes in the screen. Briefly, a 5 gram sample of each material was placed on the top screen of a stack of 8 inch diameter screens, layered such that the largest opening screen was on the top. The screen sizes were 10-, 20-, 40-, 60-, 80-, 100-, and 200-mesh, with pan to catch the undersized 200-mesh material. The screen stack was placed in a Ro-Tap testing sieve shaker and allowed to run for 25 minutes. The retained material on each screen was weighed and percentage retained of total weight was calculated. Each size fraction was described using a range and to detail the fiber size distribution (Table 6). The percent retained by each mesh size will preferably be in the approximate range set out in the range column in Table 6.

TABLE 6

| | Ecofibre Product 17 Data % Retained on Mesh | | | |
|---|---|---|---|---|
| Mesh | Range | Sample 1 | Sample 2 | Sample Average |
| +10 | 3-10 | 3.6 | 9.8 | 6.7 |
| +20 | 12-20 | 18.6 | 13.4 | 16.0 |
| +40 | 20-25 | 23.7 | 23.0 | 23.4 |
| +60 | 20-25 | 23.5 | 23.0 | 23.3 |
| +80 | 10-12 | 10.8 | 10.7 | 10.7 |
| +100 | 5-8 | 6.6 | 6.9 | 6.7 |
| +200 | 5-8 | 6.1 | 6.3 | 6.2 |
| pan | 6-7 | 7.0 | 6.9 | 6.9 |
| | Sawtrim Data % Retained on Mesh | | | |
| Mesh | Range | Sample 1 | Sample 2 | Sample Average |
| +10 | 40-50 | 47.3 | 47.5 | 47.4 |
| +20 | 15-20 | 19.7 | 18.9 | 19.3 |
| +40 | 10-13 | 11.2 | 10.7 | 11.0 |
| +60 | 6-8 | 7.3 | 7.6 | 7.4 |
| +80 | 2-4 | 2.9 | 3.2 | 3.0 |
| +100 | 1-3 | 2.1 | 2.0 | 2.0 |
| +200 | 4-6 | 5.2 | 5.2 | 5.2 |
| pan | 4-6 | 4.4 | 5.0 | 4.7 |

The data indicate that a ligno-cellulosic fiber, EcoFibre™ (Product 17), has a good distribution of fibers within each size fraction, while 66.7% of the sawtrim (a wood residual) has the majority of the size fraction distributed in the larger sizes—i.e. a +20 mesh size distribution.

Example 8

To quantify the lubricity of the fibers in solution, a 7 gram sample of fiber (based on 12% MC) was placed into 300 milliliters of tap water at ambient room temperature. The material was stirred with a spoonula and rated against two known fibers—a very finely ground refined wood fiber (VFO) (screened fiber is +28 Mesh is 35% to 45% of total weight) available from Canadian Forest Products Ltd., Product Number 3-F3-45), that was rated a 1, and a 50% blended mulch product of refined wood fiber and 50% cellulose paper known for its high loading characteristics, that was rated a 10. The fiber lubricity rating of 10 indicated that slurry was easier to stir because of less interaction of the fibers between one another. The lubricity test was conducted on the refined softwood fiber, hogged hardboard sawtrim and various blends. No surfactant was used to treat the fibers

TABLE 7

| Sample | Lubricity Test Rating |
|---|---|
| VFO | 1 |
| 50% Wood/50% Paper | 10 |
| Sawtrim | 12 |
| Product 17 | 2 |
| 10% Sawtrim/90% Product 17 | 3 |
| 30% Sawtrim/70% Product 17 | 6.5 |
| 50% Sawtrim/50% Product 17 | 10 |

Table 7 illustrates that an addition of sawtrim fiber to the refined fiber—Product 17 increases the fiber lubricity to the same level as a known wood/paper mulch.

Example 9

Various concentrations of Pluronic 25R2 surfactant was used to treat the Product 17 refined fiber. The treated fiber was blended with different levels of untreated sawtrim and the fiber lubricity test was conducted on the blended samples.

TABLE 8

| Sample | Concentration of Surfactant on Product 17 | Lubricity Test Rating |
| --- | --- | --- |
| VFO | — | 1 |
| 50% Wood/50% Paper | — | 10 |
| 50% Sawtrim/50% Product 17 | 0 | 10 |
| 50% Sawtrim/50% Product 17 | 0.1 | 11 |
| 50% Sawtrim/50% Product 17 | 0.2 | 12 |
| 50% Sawtrim/50% Product 17 | 0.3 | 12 |

Table 8 illustrates the results showing that with a surfactant, the lubricity of the fibers increases to a 12 from an untreated fiber lubricity rating of only 10.

At loading rates greater than 1300 lbs fiber per 3000 gallons of water, if a refined wood fiber is used alone, the fiber can tend to form a mass which creates difficulties for the high pressure pump to operate and for the material to flow out the hose and be sprayed through a nozzle. This decrease in the fiber lubricity of the slurry can be overcome by incorporating the sawtrim material (residual wood fibers) having a flake-like geometry and higher bulk density.

While an embodiment of the invention has been illustrated and described, it is not intended that the embodiment illustrates and describes all possible forms of the invention. Rather, the words used in the specification are words of description rather than limitation, and it is understood that various changes may be made without departing from the spirit and scope of the invention.

What is claimed is:

1. A visually-attenuated erosion control medium formed from hydraulic-application on a ground surface of a slurry comprising a blended mulch product and water, the blended mulch product comprising:
   ligno-cellulosic fibers;
   a tackifier;
   a visual attenuation composition including a colorant selected from the group consisting of a pigment, a dye, and combinations thereof to visually attenuate or camouflage the erosion control medium to approximate color characteristics of natural surrounding terrain; and
   substantially straight synthetic fibers each having a straight ratio($D_{not}$:$D_{max}$) of at least about 3:5 to about 1:1; wherein $D_{max}$ represents a maximum potential distance of a particular synthetic fiber having a first end point and a second end point, with the first and second end points located at opposing ends of an elongated portion of the particular synthetic fiber, the maximum potential distance being measured along the elongated portion of the particular synthetic fiber when the particular synthetic fiber is completely straight; and wherein $D_{not}$ represents a notional shortest distance between the end points;
   wherein the erosion control medium forms a substantially homogenous open weave matrix on the ground surface.

2. The visually-attenuated erosion control medium of claim 1, wherein the colorant provides a color of green to the erosion control medium as applied and the color of green substantially remains for a period of up to 2 to 8 weeks.

3. The visually-attenuated erosion control medium of claim 2, wherein the colorant includes phthalocyanine, copperthalocyanide, and combinations thereof.

4. The visually-attenuated erosion control medium of claim 1, wherein the colorant is provided in an amount of 3 to 75 pounds per ton of the blended mulch product.

5. The visually-attenuated erosion control medium of claim 1 further comprising a mordant to impart colorfastness of the visually attenuated erosion control medium for a period of up to 2 to 6 months.

6. The visually-attenuated erosion control medium of claim 1, wherein the colorant is selected to approximate, for a period of up to 2 to 6 months, the surrounding terrain's color characteristics of being red, yellow, blue, white, black, green, brown, pink, and combinations thereof, and includes at least one pigment selected from the group consisting of arsenic pigments, carbon pigments, cadmium pigments, iron oxide pigments, chromium pigments, cobalt pigments, lead pigments, copper pigments, titanium pigments, ultramarine pigments, mercury pigments, zinc pigments, clay earth pigments, iron oxides, pigments of biological origin, organic pigments, and combinations thereof.

7. The visually-attenuated erosion control medium of claim 1, wherein the visual attenuation composition further comprises an additive selected from the group consisting of a flocculant, a stabilizer, and combinations thereof.

8. The visually attenuated erosion control medium of claim 7, wherein the additive includes a stabilizer provided in an amount of 0.1% to 5% by weight of the total weight of the visual attenuation composition, the stabilizer being selected from the group consisting of petroleum resins, coumarone-indene resins, terpene-phenol resins, rosin resin, xylene and formaldehyde resins, and combinations thereof.

9. The visually attenuated erosion control medium of claim 7, wherein the additive contains a flocculant provided in an amount of 0.01% to 2% by weight of the total weight of the visual attenuation composition, the flocculant being selected from the group consisting of alum, aluminum chlorohydrate, aluminum sulfate, calcium oxide, iron chloride, iron sulfate, sodium aluminate, sodium silicate, polyacrylamides, chitosans, and combinations thereof.

10. The visually attenuated erosion control medium of claim 1, wherein the substantially straight synthetic fibers include monofilament fibers.

11. The visually-attenuated erosion control medium of claim 1, wherein the substantially straight synthetic fibers are selected from the group consisting of polyolefin fibers, polyester fibers, polyamide fibers and mixtures thereof.

12. The visually-attenuated erosion control medium of claim 1, further comprising organic fibers including wool.

13. The visually attenuated erosion control medium of claim 1, wherein each of the substantially straight synthetic fibers have an elongated portion having a length of between about 0.375 inches to about 0.625 inches.

14. The visually-attenuated erosion control medium of claim 1, wherein the lingo-cellulosic fibers are provided in an amount of about 75% to about 92% by weight of the total weight of the blended mulch product.

15. The visually-attenuated erosion control medium of claim 1, wherein the substantially straight synthetic fibers are provided in an amount of about 1% to about 10% by weight of the total weight of the blended mulch product.

16. The visually-attenuated erosion control medium of claim 1, wherein the ligno-cellulosic fibers include softwood fibers.

* * * * *